US012477281B2

(12) United States Patent
Li et al.

(10) Patent No.: US 12,477,281 B2
(45) Date of Patent: Nov. 18, 2025

(54) SPEAKER

(71) Applicant: AAC Microtech (Changzhou) Co., Ltd., Jiangsu (CN)

(72) Inventors: Jinming Li, Changzhou (CN); Zhizhu Chen, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 245 days.

(21) Appl. No.: 18/323,373

(22) Filed: May 24, 2023

(65) Prior Publication Data

US 2024/0284106 A1 Aug. 22, 2024

Related U.S. Application Data

(63) Continuation of application No. PCT/CN2023/076320, filed on Feb. 16, 2023.

(51) Int. Cl.

| | |
|---|---|
| ***H04R 9/02*** | (2006.01) |
| ***H04R 1/06*** | (2006.01) |
| ***H04R 7/20*** | (2006.01) |
| ***H04R 9/04*** | (2006.01) |
| ***H04R 9/06*** | (2006.01) |
| ***H04R 31/00*** | (2006.01) |

(52) U.S. Cl.

CPC ............. *H04R 9/025* (2013.01); *H04R 9/045* (2013.01); *H04R 9/06* (2013.01); *H04R 1/06* (2013.01); *H04R 7/20* (2013.01); *H04R 31/006* (2013.01); *H04R 2400/07* (2013.01); *H04R 2400/11* (2013.01); *H04R 2499/11* (2013.01)

(58) Field of Classification Search

CPC .......... H04R 9/025; H04R 9/045; H04R 9/06; H04R 2400/07; H04R 2400/11; H04R 7/20; H04R 1/06; H04R 2499/11; H04R 31/006

See application file for complete search history.

(56) References Cited

U.S. PATENT DOCUMENTS

| | | | | |
|---|---|---|---|---|
| 9,813,821 B1 * | 11/2017 | Song | ...................... | H04R 9/025 |
| 2018/0302722 A1 * | 10/2018 | Linghu | .................. | H04R 9/025 |
| 2018/0367917 A1 * | 12/2018 | Choisel | .................. | H04R 9/046 |
| 2020/0045459 A1 * | 2/2020 | Hu | ......................... | H05K 1/028 |
| 2020/0053476 A1 * | 2/2020 | Xiao | ...................... | H04R 9/025 |
| 2021/0029464 A1 * | 1/2021 | Pan | .......................... | H04R 9/04 |
| 2022/0417666 A1 * | 12/2022 | Liu | .......................... | H04R 9/06 |
| 2023/0217179 A1 * | 7/2023 | Liu | .......................... | H04R 7/18 381/345 |

* cited by examiner

*Primary Examiner* — Carolyn R Edwards
*Assistant Examiner* — Kuassi A Ganmavo
(74) *Attorney, Agent, or Firm* — Wiersch Law Group

(57) ABSTRACT

The present invention provides a speaker includes a frame, a vibration system, and a magnetic circuit system. The vibration system includes a diaphragm, a voice coil assembly, and a printed circuit board. The printed circuit board is arranged on both sides of the speaker. The magnetic circuit system includes a magnetic bowl and a magnet assembly. The printed circuit board includes a first fixing portion mounted with the frame, a second fixing portion mounted with the voice coil assembly, and a connecting portion. The connecting portion extends toward a direction of the magnet assembly until a part of a projection of the connecting portion along a vibration direction of the diaphragm is located on the magnet assembly. The speaker can increase the length of the force arm under the premise of minimizing the loss of BL, and improve the acoustic performance of the product.

10 Claims, 4 Drawing Sheets

SPEAKER

FIELD OF THE PRESENT INVENTION

The present invention relates to the field of electro-acoustic conversion, and more particularly, to a speaker.

DESCRIPTION OF RELATED ART

Speaker, also known as horn, is used in speaker boxes to convert audio signals into sound. As customers' requirements for consumer electronics products increase, the speakers are given more requirements.

In related art, the speaker includes a frame, a vibration system fixed on the frame, and a magnetic circuit system having a magnetic gap. The magnetic circuit system drives the vibration system to generate sounds. The vibration system includes a diaphragm mounted on the frame, a voice coil at least partially located into the magnetic gap, and a printed circuit board. Due to the limitation of space, the printed circuit board is arranged at both ends of the speaker, and since the length of the elastic arm of the printed circuit board is too short, it cannot meet the life requirement.

Therefore, it is desired to provide a new speaker which can overcome the above problems.

SUMMARY

In view of the above, the embodiments of the present invention provide a new speaker. By the present invention, the speaker can increase the length of the elastic arm of the printed circuit board under the premise of minimizing the loss of magnetic force value.

The present invention provides a speaker includes a frame, a vibration system supported on the frame, and a magnetic circuit system having a magnetic gap. The vibration system includes a diaphragm, a voice coil assembly at least partially located into the magnetic gap and driving the diaphragm to generate sounds; and a printed circuit board. The printed circuit board is arranged on both sides of the speaker along a first direction. The magnetic circuit system includes a magnetic bowl and a magnet assembly fixed on the magnetic bowl. The printed circuit board includes a first fixing portion mounted with the frame, a second fixing portion mounted with the voice coil assembly, and a connecting portion connecting the first fixing portion and the second fixing portion. The connecting portion extends toward a direction of the magnet assembly until a part of a projection of the connecting portion along a vibration direction of the diaphragm is located on the magnet assembly.

As an improvement, the magnet assembly includes a main magnet and a plurality of auxiliary magnets forming the magnetic gap with the main magnet, the auxiliary magnets arranged on both sides of the main magnet along a second direction perpendicular to the first direction, the connecting portion extending toward the direction of the auxiliary magnet until the part of the projection of the connecting portion along the vibration direction of the diaphragm located on the auxiliary magnet.

As an improvement, the auxiliary magnet recessing to form an avoidance portion to avoid the connecting portion.

As an improvement, the connecting portion extends towards the direction of the auxiliary magnet and exceeds a position of the second fixing portion.

As an improvement, the first fixing portion includes a first part located in the first direction and a second part located in the second direction and connected with the first part, the connecting portion including a first extension part bending and extending to both sides from a middle position of the second fixing portion, a second extension part bending and extending from the first extension part toward the auxiliary magnet, and a third extension part bending and extending from the second extension part to connect to the second part.

As an improvement, the second fixing portion of the printed circuit board includes a soldering portion disposed on each end of the second fixing portion.

As an improvement, the voice coil assembly includes a voice coil and a voice coil support connecting the voice coil and the diaphragm, the voice coil support including a first joint part connected to a surface of the voice coil proximal to the diaphragm, a plurality of supporting legs extending from one side of the first joint part toward the direction of the printed circuit board and connected to the second fixing portion of the printed circuit board, and a second joint part extending from the other side of the first joint part toward the diaphragm and attached to the diaphragm.

As an improvement, the magnetic bowl includes a carrying portion carrying the magnet assembly and a fixing arm bending and extending from both sides of the carrying portion, the fixing arm connected to the first fixing portion of the printed circuit board.

As an improvement, a hollow part is provided on the carrying portion of the magnetic bowl corresponding to the position of the second fixing portion and part of the connecting portion of the printed circuit board.

As an improvement, the speaker has a rectangular shape, and the first direction is a short axis direction of the speaker, and the second direction is a long axis direction of the speaker.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
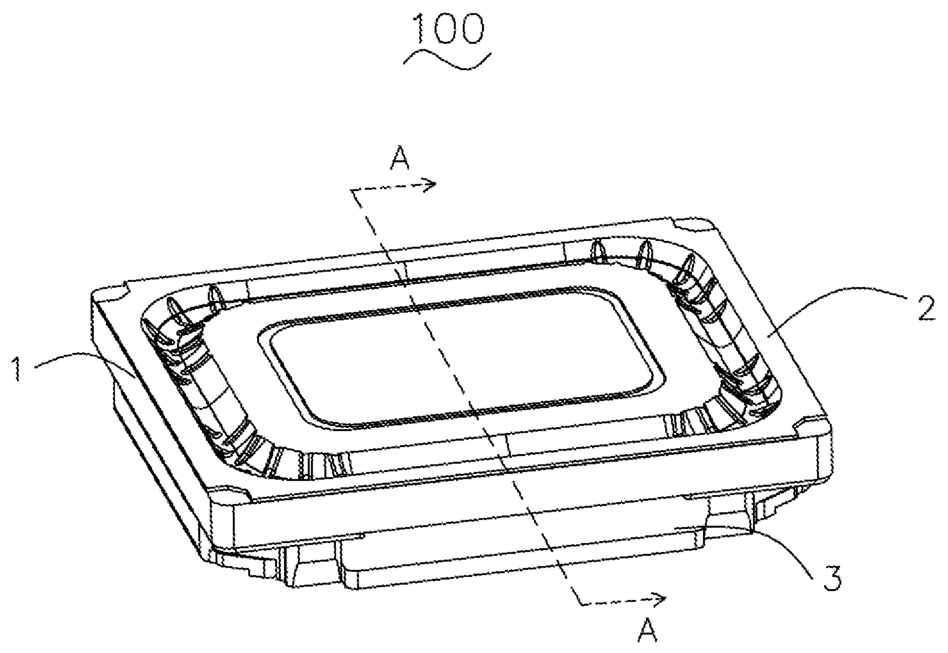
FIG. 1 is an illustrative isometric view of a speaker in accordance with one embodiment of the present invention.
Figure 2:
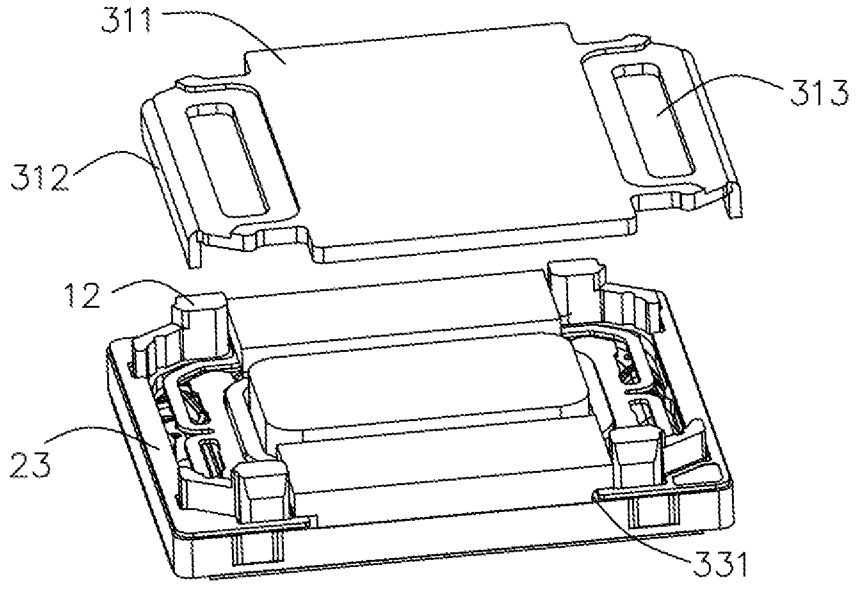
FIG. 2 is a partially exploded view of the speaker of FIG. 1.
Figure 3:
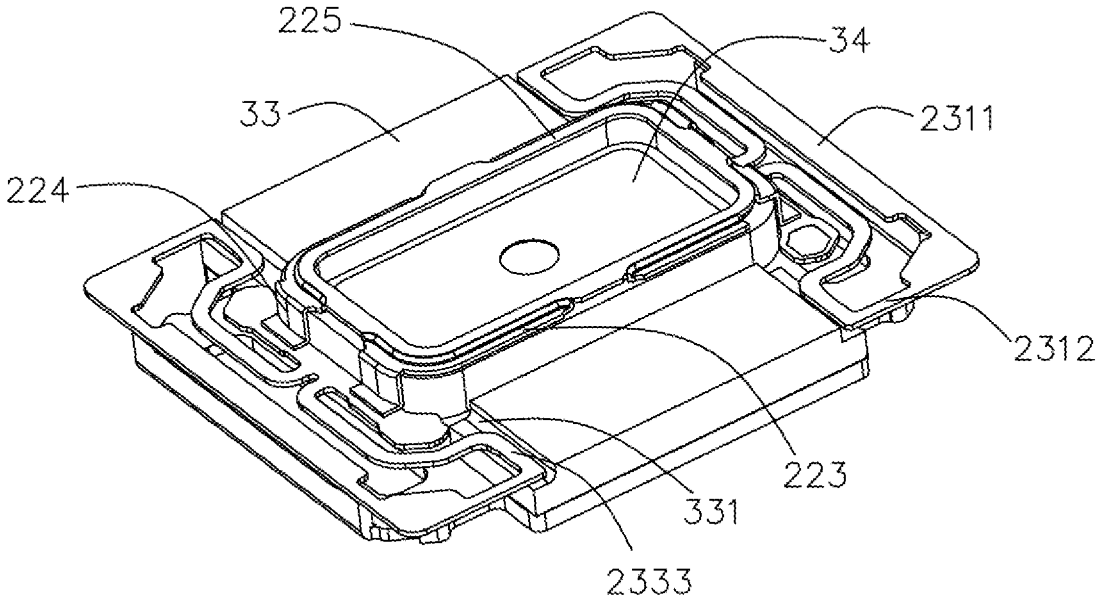
FIG. 3 is an illustrative isometric view of partial structure of the speaker of FIG. 1.
Figure 4:
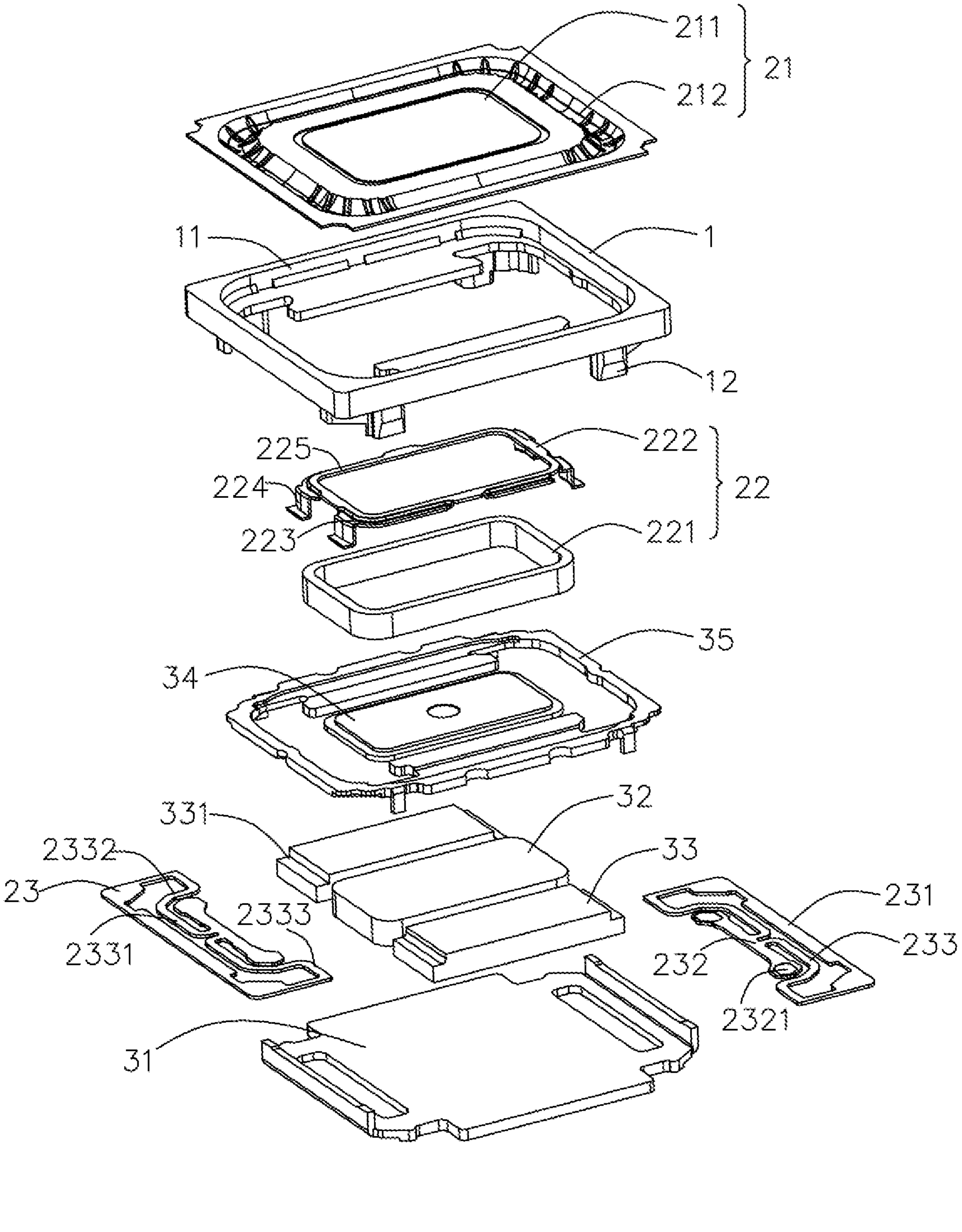
FIG. 4 is an exploded view of the speaker of FIG. 1.
Figure 5:
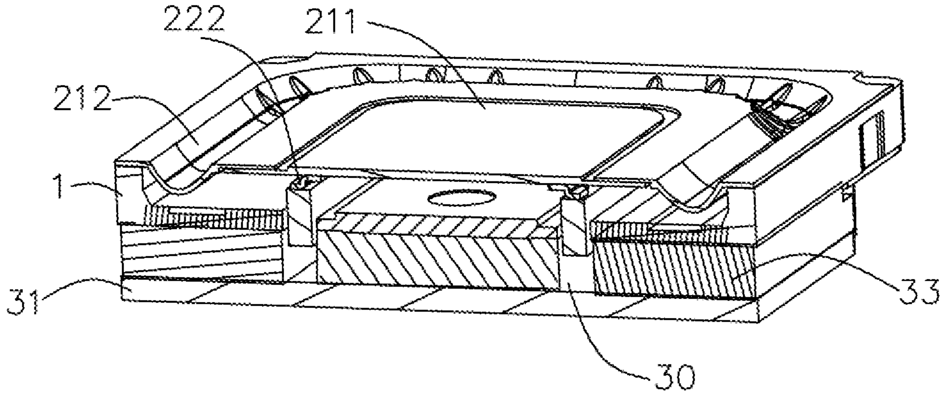
FIG. 5 is an illustrative cross-sectional view of the speaker taken along line A-A of FIG. 1.

Referring to the FIGS. 1-5, the present invention provides one embodiment of a speaker 100. The speaker 100 includes a frame 1, a vibration system 2 supported on the frame 1, and a magnetic circuit system 3 having a magnetic gap 30. The vibration system 2 and the magnetic circuit system 3 are supported with the frame 1 respectively, and the magnetic circuit system 3 drives the vibration system 2 to vibrate and sound. The speaker 100 has a rectangular shape. A first direction is defined as a short axis direction of the speaker 100, and a second direction is defined as a long axis direction of the speaker 100. The first direction is perpendicular to the second direction, and both the first direction and the second direction are perpendicular to the vibration direction of the vibration system 2.

The frame 1 is substantially rectangular, and the frame 1 includes a main portion 11 with an annular shape and a plurality of supporting portions 12 extending from the main portion 11. The supporting portions 12 are located at the four corners of the frame 1.

The vibration system 2 includes a diaphragm 21, a voice coil assembly 22 at least partially located into the magnetic gap 30 and driving the diaphragm 21 to generate sounds, and a printed circuit board 23 elastically supporting the voice coil assembly 22.

The diaphragm 21 includes a dome 211 and an annular suspension 212 surrounding the dome 211. The suspension 212 is disposed around the dome 211. One end of the suspension 212 is fixed to the main portion 11 of the frame 1, and the other end of the suspension 212 is fixed to the dome 211.

The voice coil assembly 22 includes a voice coil 221 and a voice coil support 222 connecting the voice coil 221 and the diaphragm 21. The voice coil 221 is a rounded rectangular structure. The voice coil support 222 can be a plastic voice coil support or a metal voice coil support. The voice coil support 222 includes a first joint part 223 connected to a surface of the voice coil 221 proximal to the diaphragm 21, a plurality of supporting legs 224 extending from one side of the first joint part 223 toward the direction of the printed circuit board 23 and connected to the printed circuit board 23, and a second joint part 225 extending from the other side of the first joint part 223 toward the diaphragm 21 and attached to the dome 211. The number of the supporting legs 224 is multiple. The supporting legs 224 are arranged at intervals along the short axis direction of the voice coil 221. The second joint part 225 is a ring structure.

The printed circuit board 23 is arranged on both sides of the speaker 100 along the first direction. That is, each of the two short axis directions of the speaker 100 is provided with one printed circuit board 23. The printed circuit board 23 includes a first fixing portion 231 mounted with the frame 1, a second fixing portion 232 mounted with the voice coil assembly 22, and a connecting portion 233 connecting the first fixing portion 231 and the second fixing portion 232. The supporting legs 224 of the voice coil support 222 are fixed and connected with the second fixing portion 232. The first fixing portion 231 includes a first part 2311 located in the first direction and a second part 2312 located in the second direction and connected with the first part 2311. The second fixing portion 232 of the printed circuit board 23 includes a soldering portion 2321 disposed on each end of the second fixing portion 232.

The magnetic circuit system 3 includes a magnetic bowl 31, a main magnet 32 mounted on the magnetic bowl 31, a plurality of auxiliary magnets 33 forming the magnetic gap 30 with the main magnet 32, a main pole plate 34 disposed on the main magnet 32, and an auxiliary pole plate 35 disposed on the auxiliary magnets 33. The main magnet 32 and the auxiliary magnets 33 are composed a magnet assembly of the magnetic circuit system 3. The number of the auxiliary magnets 33 is two, and the auxiliary magnets 33 are arranged on both sides of the main magnet 32 along the second direction. The magnetic bowl 31 includes a carrying portion 311 carrying the main magnet 32 and the auxiliary magnets 33 and a fixing arm 312 bending and extending from both sides of the carrying portion 311. The carrying portion 311 is connected with the supporting portion 12 of the frame 1, and the fixing arms 312 is connected to the first fixing portion 231 of the printed circuit board 23. A hollow part 313 is provided on the carrying portion 311 of the magnetic bowl 31 corresponding to the position of the second fixing portion 232 and part of the connecting portion 233 of the printed circuit board 23. The hollow part 313 can be used as leakage.

The connecting portion 233 of the printed circuit board 23 extends toward the direction of the magnet assembly until the part of a projection of the connecting portion 233 along the vibration direction of the diaphragm 21 located on the magnet assembly. In detail, the connecting portion 233 extends toward the direction of the auxiliary magnet 33 until the part of the projection of the connecting portion 233 along the vibration direction of the diaphragm 21 located on the auxiliary magnet 33. The position of the auxiliary magnet 33 corresponding to the connecting portion 233 recesses to form an avoidance portion 331 to avoid the connecting portion 233. Both end of each auxiliary magnet 33 are provides with the avoidance portion 331.

The connecting portion 233 extends towards the direction of the auxiliary magnet 33 and exceeds a position of the second fixing portion 232. In detail, the connecting portion 233 includes a first extension part 2331 bending and extending to both sides from a middle position of the second fixing portion 232, a second extension part 2332 bending and extending from the first extension part 2331 toward the auxiliary magnet 33, and a third extension part 2333 bending and extending from the second extension part 2332 to connect to the second part 2312 of the first fixing portion 231. The projections of the third extension part 2333 and part of the second extension part 2332 along the vibration direction of the diaphragm 21 locates on the avoidance portion 331. In this way, as a force arm, the connecting portion 233 of the printed circuit board 23 effectively increases its length, which can provide higher elasticity requirements and also increase the life of the printed circuit board 23.

Comparing with the related art, in the speaker of present invention, the speaker includes a frame, a vibration system supported on the frame, and a magnetic circuit system having a magnetic gap. The vibration system includes a diaphragm, a voice coil assembly at least partially located into the magnetic gap and driving the diaphragm to generate sounds; and a printed circuit board. The printed circuit board is arranged on both sides of the speaker along a first direction. The magnetic circuit system includes a magnetic bowl and a magnet assembly fixed on the magnetic bowl. The printed circuit board includes a first fixing portion mounted with the frame, a second fixing portion mounted with the voice coil assembly, and a connecting portion connecting the first fixing portion and the second fixing portion. The connecting portion extends toward a direction of the magnet assembly until a part of a projection of the connecting portion along a vibration direction of the diaphragm is located on the magnet assembly.

An important performance indicator of the speaker is the BL value of the voice coil (that is, the magnetic force value, which is the product of the magnetic flux density B and the length L of the voice coil). The higher value of the BL of the voice coil, the diaphragm will have a greater displacement, and the higher sound pressure level and the sensitivity of the speaker. In present invention, by increasing the length of the connection portion of the printed circuit board, the invention increases the length of the force arm under the premise of minimizing the loss of BL, which meets the life requirement of the printed circuit board, and improves the acoustic performance of the product.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, comprising:
- a frame;
- a vibration system supported on the frame, the vibration system comprising:
  - a diaphragm;
  - a voice coil assembly driving the diaphragm to generate sounds; and
  - a printed circuit board elastically supporting the voice coil assembly, the printed circuit board arranged on both sides of the speaker along a first direction, the printed circuit board comprising:
  - a first fixing portion mounted with the frame;
  - a second fixing portion mounted with the voice coil assembly; and
  - a connecting portion shaped as a flat plate being suspended and connecting the first fixing portion and the second fixing portion;
- a magnetic circuit system having a magnetic gap, the voice coil assembly at least partially located into the magnetic gap, the magnetic circuit system comprising:
  - a magnetic bowl;
  - a magnet assembly fixed on the magnetic bowl;
- wherein the connecting portion extends toward a direction of the magnet assembly until a part of a projection of the connecting portion along a vibration direction of the diaphragm is located on the magnet assembly.

2. The speaker as described in claim 1, wherein the magnet assembly comprises a main magnet and a plurality of auxiliary magnets forming the magnetic gap with the main magnet, the auxiliary magnets arranged on both sides of the main magnet along a second direction perpendicular to the first direction, the connecting portion extending toward the direction of the auxiliary magnet until the part of the projection of the connecting portion along the vibration direction of the diaphragm located on the auxiliary magnet.

3. The speaker as described in claim 2, wherein the auxiliary magnet recessing to form an avoidance portion to avoid the connecting portion.

4. The speaker as described in claim 2, wherein the connecting portion extends towards the direction of the auxiliary magnet and exceeds a position of the second fixing portion.

5. The speaker as described in claim 4, wherein the first fixing portion comprises a first part located in the first direction and a second part located in the second direction and connected with the first part, the connecting portion comprising a first extension part bending and extending to both sides from a middle position of the second fixing portion, a second extension part bending and extending from the first extension part toward the auxiliary magnet, and a third extension part bending and extending from the second extension part to connect to the second part.

6. The speaker as described in claim 2, wherein the speaker has a rectangular shape, and the first direction is a short axis direction of the speaker, and the second direction is a long axis direction of the speaker.

7. The speaker as described in claim 1, wherein the second fixing portion of the printed circuit board comprises a soldering portion disposed on each end of the second fixing portion.

8. The speaker as described in claim 1, wherein the voice coil assembly comprises a voice coil and a voice coil support connecting the voice coil and the diaphragm, the voice coil support comprising a first joint part connected to a surface of the voice coil proximal to the diaphragm, a plurality of supporting legs extending from one side of the first joint part toward the direction of the printed circuit board and connected to the second fixing portion of the printed circuit board, and a second joint part extending from the other side of the first joint part toward the diaphragm and attached to the diaphragm.

9. The speaker as described in claim 1, wherein the magnetic bowl comprises a carrying portion shaped as a flat plate and carrying the magnet assembly and a fixing arm shaped as a flat plate and bending and extending from both sides of the carrying portion, the fixing arm connected to the first fixing portion of the printed circuit board.

10. The speaker as described in claim 9, wherein a hollow part is provided on the carrying portion of the magnetic bowl corresponding to the position of the second fixing portion and part of the connecting portion of the printed circuit board.

* * * * *